US009461990B2

(12) United States Patent
Dietrich

(10) Patent No.: US 9,461,990 B2
(45) Date of Patent: *Oct. 4, 2016

(54) METHOD FOR READING ATTRIBUTES FROM AN ID TOKEN

(71) Applicant: BUNDESDRUCKEREI GMBH, Berlin (DE)

(72) Inventor: Frank Dietrich, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 49 days.

This patent is subject to a terminal disclaimer.

(21) Appl. No.: 14/452,694

(22) Filed: Aug. 6, 2014

(65) Prior Publication Data
US 2015/0033028 A1    Jan. 29, 2015

Related U.S. Application Data

(63) Continuation of application No. 13/381,572, filed as application No. PCT/EP2010/060066 on Jul. 13, 2010, now Pat. No. 8,806,582.

(30) Foreign Application Priority Data

Jul. 14, 2009 (DE) .......................... 10 2009 027 681

(51) Int. Cl.
*G06F 7/04* (2006.01)
*G06F 15/16* (2006.01)
(Continued)

(52) U.S. Cl.
CPC ........... *H04L 63/0853* (2013.01); *G06F 21/33* (2013.01); *G06F 21/34* (2013.01);
(Continued)

(58) Field of Classification Search
CPC . H04L 63/0853; H04L 9/3234; G06F 21/31; G06F 21/34; G06F 21/62
USPC ..................... 726/1–5, 9; 713/168, 172–174, 713/176–180, 182, 185; 705/65, 67
See application file for complete search history.

(56) References Cited

U.S. PATENT DOCUMENTS 5,825,875 A    10/1998   Ugon
7,103,575 B1    9/2006   Linehan
(Continued)

FOREIGN PATENT DOCUMENTS

CN          101048790        10/2007
DE       10 2008 000 067      7/2009
(Continued)

OTHER PUBLICATIONS

Best Practices-Timestamps & Nonces Hal Lockhart Mon, Apr. 14, 2008 19:28:52/0700.
(Continued)

*Primary Examiner* — Christopher Revak
*Assistant Examiner* — Vadim Savenkov
(74) *Attorney, Agent, or Firm* — Leveque Intellectual Property Law, P.C.

(57) ABSTRACT

A method for reading at least one attribute stored in an ID token assigned to a user involving: authenticating the user to the ID token, authenticating a first computer system to the ID token, and, assuming successful authentication of the user and the first computer system to the ID token, read access by the first computer system to the at least one attribute stored in the ID token for transmission of the at least one attribute to a second computer system, and generating of a time indication for the at least one attribute by the first computer system.

20 Claims, 6 Drawing Sheets

(51) Int. Cl.
  *G06F 17/30*   (2006.01)
  *H04L 29/06*   (2006.01)
  *G06F 21/33*   (2013.01)
  *G06F 21/34*   (2013.01)
  *G06F 21/62*   (2013.01)
  *H04L 9/32*    (2006.01)

(52) U.S. Cl.
  CPC ............ *G06F 21/62* (2013.01); *H04L 9/3234* (2013.01); *H04L 9/3247* (2013.01); *H04L 63/0823* (2013.01); *H04L 63/102* (2013.01); *G06F 2221/2103* (2013.01); *G06F 2221/2115* (2013.01); *G06F 2221/2141* (2013.01); *G06F 2221/2151* (2013.01)

(56) References Cited

U.S. PATENT DOCUMENTS

| | | | |
|---|---|---|---|
| 7,216,083 B2 | 5/2007 | Parmelee et al. | |
| 7,424,732 B2 | 9/2008 | Matsumoto et al. | |
| 8,438,398 B2* | 5/2013 | Masushio | H04L 9/3247 713/178 |
| 8,527,757 B2* | 9/2013 | Lu | G06F 21/6263 713/168 |
| 2001/0045451 A1 | 11/2001 | Tan | |
| 2003/0041244 A1* | 2/2003 | Buttyan | G06Q 20/20 713/172 |
| 2004/0215964 A1 | 10/2004 | Barlow et al. | |
| 2005/0187883 A1* | 8/2005 | Bishop | G06Q 20/027 705/67 |
| 2007/0118891 A1 | 5/2007 | Buer | |
| 2007/0283424 A1 | 12/2007 | Kinser et al. | |
| 2007/0294431 A1 | 12/2007 | Adelman et al. | |
| 2008/0010220 A1 | 1/2008 | Hobson et al. | |
| 2011/0023103 A1 | 1/2011 | Dietrich et al. | |
| 2011/0296512 A1 | 12/2011 | Dietrich et al. | |
| 2011/0302646 A1* | 12/2011 | Ronda | H04L 9/3213 726/9 |

FOREIGN PATENT DOCUMENTS

| | | |
|---|---|---|
| DE | 10 2008 040 416 | 1/2010 |
| DE | 10 2008 042 262 | 4/2010 |
| DE | 10 2009 026 953 | 12/2010 |

OTHER PUBLICATIONS

Timestamping of digital signatures (mini-FAQ) Eldos.com. Shown as crawled by Wayback Machine on Apr. 10, 2009.

Transaction authentication number from Wikipedia, the free encyclopedia. Shown as drawled by Wayback Machine on Mar. 4, 2009.

Electronic identity card from Wikipedia, the free encyclopedia (obtained via Wayback Machine0 last modified on Nov. 7, 2007. At 20:57.

Bundesamt Fur Sicherheit in Der Informationstechnik, Technische Richlinie eID-Server, BSI TR-03130, Version 1.0 RCE, May 19, 2009, pp. 1-48, XP007905025, Section 3.3, Section 4, Appendix A.

Kain et al., SAML 2.0, ein Tutorium-Teil 1: Theorie, XMLSPEKTRUM, 2007, pp. 55-59, XP007915026, abstract, section assertions, section protocols.

Bundesamt Fur Sicherheit in Der Informationstechnik, Technische Richlinie TR-03127, Architektur Elektronischer Personalusweis, DE, No. Version 0.5, Apr. 17, 2009, pp. 1-37, XP007914804, abstract, Section 4.5.

Chappell, D., "Introducing Windows CardSpace", www.msdn.microsoft.com, Apr. 1, 2006.

"OpenID Authentication 2.0—Final", www.specs@openid.net, Dec. 5, 2007.

* cited by examiner

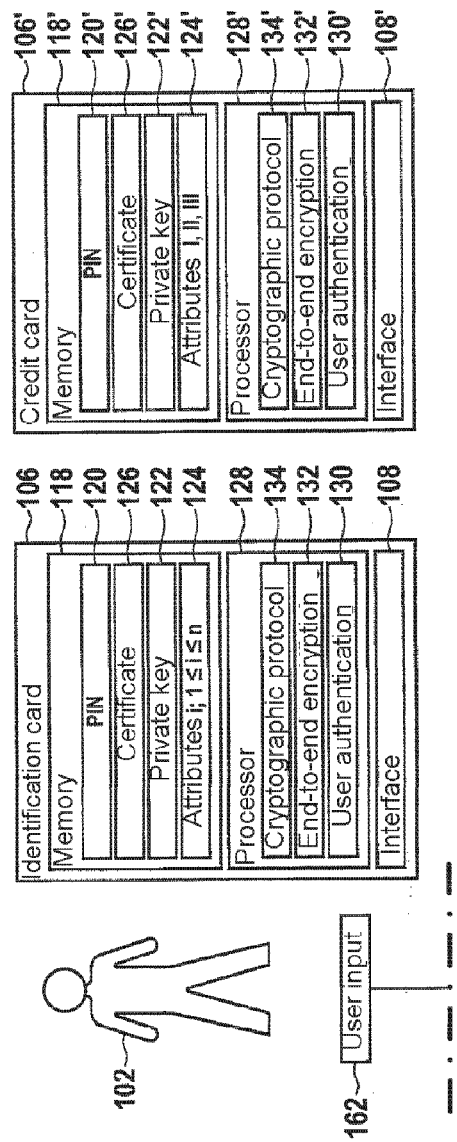

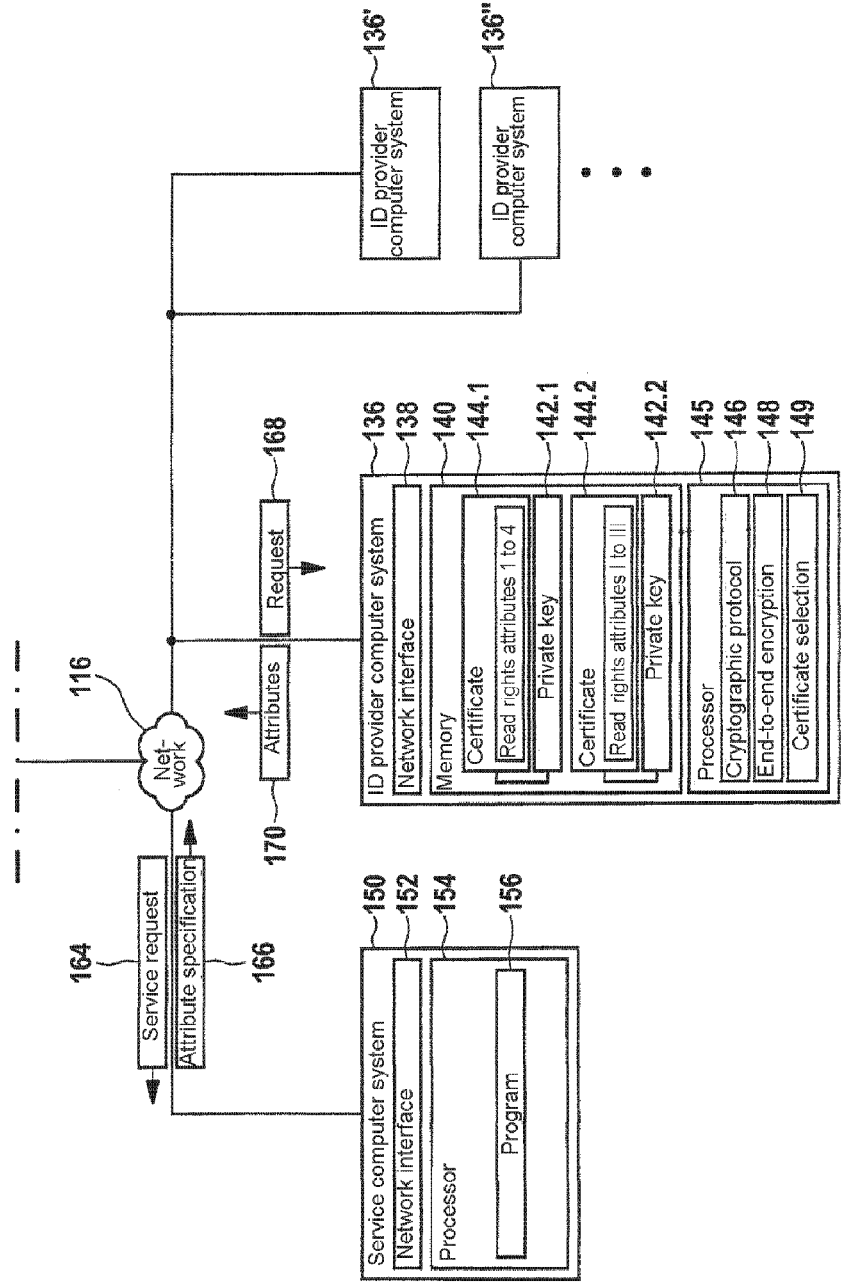

METHOD FOR READING ATTRIBUTES FROM AN ID TOKEN

PRIORITY CLAIM

This application is a continuation of U.S. patent application Ser. No. 13/381,572 filed on Mar. 19, 2012, now U.S. Pat. No. 8,806,582 issued on Aug. 12, 2014, which is a 371 application of PCT/EP2010/060066 with an international filing date of Jul. 13, 2010, which claims benefit of foreign priority in accordance with 35 U.S.C. 119(b) to German application No. 10 2012 201 810.7 filed Feb. 2, 2012. These prior applications, including the entire written description and drawing figures, are hereby incorporated into the present application by reference.

BACKGROUND

The invention relates to a method for reading at least one attribute from an ID token, to a computer program product, and to an ID token, as well as a computer system.

Various methods for administration of the so-called digital identification of a user are known from the state of the art:

Microsoft Windows CardSpace is a client-based digital identity system that is meant to enable Internet users to communicate their digital identity to online services. The disadvantage here, among other things, is that the user can manipulate his digital identity.

BRIEF DESCRIPTION OF THE DRAWINGS

In the following, embodiments of the invention are further explained with reference to the drawings. The figures show.

DESCRIPTION

Figure 1:
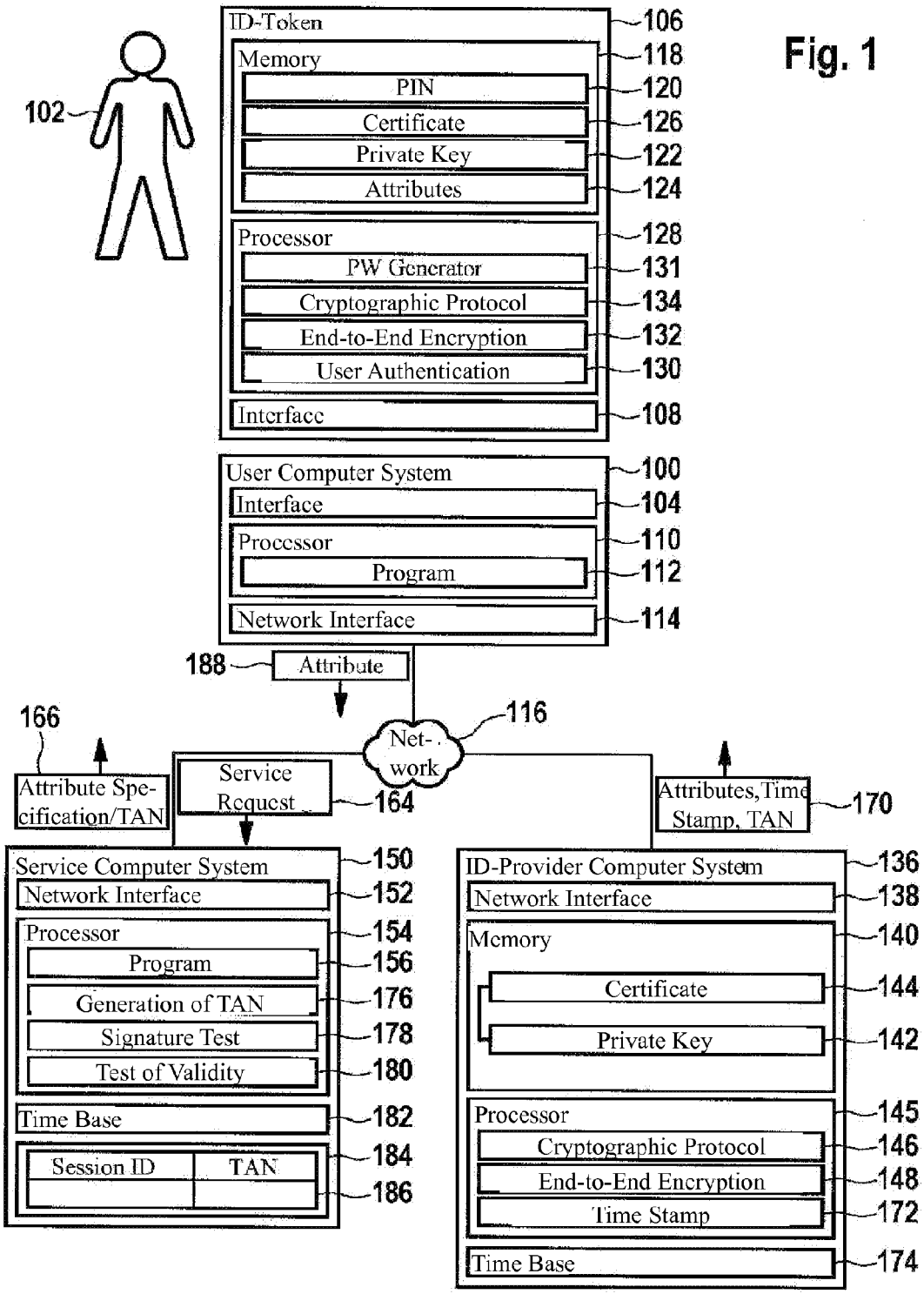
FIG. 1 shows a block diagram of an embodiment of computer systems according to the invention.

In contrast, OPENID has a server-based system. A so-called identity server stores a database with the digital identities of registered users. The disadvantage here, among other things, is a lack of data security, because the digital identities of the users are stored centrally and the user characteristics can be recorded.

A further method for administration of the digital identity is known from US 2007/0294431 A1, which also requires a user registration.

Token-based authentication methods are disclosed in the patent applications DE 10 2008 000 067.1-31, DE 10 2008 040 416.0-31, DE 10 2008 042 262.2-31 and DE 10 2009 026 953.3, of the same patent applicant, which at the time of filing have not yet been published.

In contrast, the invention is based on the challenge of developing a better method for reading at least one attribute, as well as a corresponding computer program product, an ID token, and a computer system.

The problems on which the invention is based are each solved with the characteristic features of the independent patent claims. Embodiments of the invention are given in the dependent claims.

According to the invention, a method is developed for reading at least one attribute stored in an ID token, whereby the ID token is assigned to a user. The method comprises the following steps: authenticating the user relative to the ID token; authenticating a first computer system relative to the ID token; after the user and the first computer system have been successfully authenticated relative to the ID token, read access of the first computer system to the at least one attribute stored in the ID token for transmitting the at least one attribute to a second computer system, and generation of a time indication for the at least one attribute by the first computer system. Through this means, an "anchor of confidence" can be created.

The invention enables one or more of the attributes stored in the ID token to be read by the first computer system, whereby the connection between the ID token and the first computer system can be established via a network, in particular the Internet. The at least one attribute can be a designation regarding the identity of the user assigned to the ID token, in particular regarding his so-called digital identity. For example, the first computer system reads the attributes Last Name, First Name, Address, in order to relay these attributes to a second computer system, for example, an online service.

However, a single attribute can also be read, said attribute being not for establishing the identity of the user but, for example, for verifying the user's right to utilize a particular online service, such as, e.g., the age of the user, if he wishes to access an online service that is reserved for a particular age group, or another attribute that documents the user's membership in a particular group that is entitled to use the online service.

The ID token can be a portable electronic device such as a USB stick, or a document, particularly a value document or a security document.

"Document" according to the invention is understood to mean paper-based and/or plastic-based documents, such as, e.g., pieces of identification, particularly passports, identity cards, visas, as well as driver's licenses, vehicle registration certificates, vehicle titles, employee IDs, health insurance cards, or other ID documents such as chip cards, instruments of payment, in particular bank cards and credit cards, bills of lading, or other credentials in which a data storage unit for storing the at least one attribute is integrated.

Embodiments of the invention are therefore especially advantageous because the at least one attribute is read out from a particularly trustworthy document such as an official document. It is also of particular advantage that the attribute need not be centrally stored. The invention therefore enables an especially high degree of reliability with regard to the communication of the attribute belonging to a digital identity, combined with optimal data security and extremely convenient operation.

According to one embodiment of the invention, the first computer system has at least one certificate that is used to authenticate the first computer system relative to the ID token. The certificate includes a designation of those attributes for which the first computer system has a read authorization. Using this certificate, the ID token tests whether the first computer system has the required read authorization for the read access to the attribute, before such read access can be carried out by the first computer system.

"Certificate" is understood here to mean a digital certificate, which is also termed a public key certificate. A certificate is structured data that serve to assign a public key of an asymmetric cryptographic system to an identity, such as a person or a device. For example, the certificate can conform to standard X.509 or another standard.

According to one embodiment of the invention, the first computer system sends the at least one attribute read from the ID token directly to a second computer system. The second computer system can be, for example, a server for providing an online service or some other service, such as a banking service, or for ordering a product. For example, the user can open an account online, to which end attributes that contain the user's identity are transmitted from the first computer system to the second computer system of a bank.

According to one embodiment of the invention, the transmission of the attributes read from the ID token initially occurs from the first computer system to a third computer system of the user. For example, the third computer system has an ordinary Internet browser with which the user can open a webpage of the second computer system. The user can enter a request or order for a service or product into the webpage.

The second computer system hereupon specifies those attributes, for example of the user or of his ID token, that it needs for providing the service or accepting the order. The corresponding attribute specification, which contains the specification of these attributes, is then sent from the second computer system to the first computer system. This can take place with or without interconnection of the third computer system. In the latter case, the user can specify the desired first computer system relative to the second computer system, for example by inputting the URL of the first computer system into a webpage of the second computer system from the third computer system.

According to one embodiment of the invention, the user's service request to the second computer system contains the designation of an identifier, whereby the identifier identifies the first computer system. For example, the identifier may be a link, for example, a URL of the first computer system.

According to one embodiment of the invention, the attribute specification is not sent directly from the second computer system to the first computer system, but initially from the second computer system to the third computer system. The third computer system has multiple pre-defined configuration data sets, whereby the third computer features multiple pre-defined configuration data sets, whereby each of the configuration data sets specifies a subset of attributes, at least one data source and one first computer system, from a set of first computer systems, whereby the attribute specification is transmitted from the second computer system initially to the third computer system, so that by means of the third computer system at least one of the configuration data sets is selected that specifies a subset of attributes, which contains the at least one attribute specified in the attribute specification, and whereby the third computer relays the attribute specification to the first computer system and the connection is established with the ID token specified by the designation of the data source in the selected configuration data set.

According to one embodiment of the invention, the attributes read from the ID token are signed by the first computer system and then transmitted to the third computer system. The user of the third computer system can therefore read the attributes but cannot change them. Only after release by the user are the attributes relayed from the third computer system to the second computer system.

According to one embodiment of the invention, the user can supplement the attributes with further data prior to their being relayed.

According to one embodiment of the invention, the first computer system has multiple certificates with different read accesses. After receiving the attribute specification, the first computer system selects one or more of these certificates in order to read out the corresponding attributes from the ID token or from several different ID tokens.

According to one embodiment of the invention, the third computer system has at least one configuration data set, which specifies an external data source for querying a further attribute from the third computer system via the network.

According to one embodiment of the invention, the query of the further attribute takes place after the at least one attribute has been read from the ID token, and after the third computer system has received the at least one attribute from the first computer system, whereby the query includes the at least one attribute.

Embodiments of the invention are especially advantageous because based on the time indication, the at least one attribute read by the first computer system from the ID token can feature a temporary validity. For example, the at least one attribute is provided with a time stamp by the first computer system, which indicates the time the attribute was read from the ID token or the time the attribute was sent by the first computer system.

For example, the first computer system generates a message that contains the at least one attribute and its time stamp. The first computer system sends this message as a response to the attribute specification received from the second computer system. The message can be designed as, for example, a so-called soft token. This message has a maximum period of validity starting at the time given by the time stamp.

For example, the period of validity can be a few seconds or minutes, preferably not much longer than the typical time span required for the transmission of the message from the first computer system to the second computer system. This can prevent misuse of the message, for example in which an attempt is made to manipulate the message, by means of a brute force attack. Such a brute force attack would namely require a longer time period, whereby after this time has expired, the message is already invalid.

According to a further embodiment, the time indication is the maximum validity of the message, for example, the soft token that is generated by the first computer system. This has the advantage that the trustworthy entity, that is, the first computer system, can itself determine for which maximum time period the message is to be considered valid.

According to one embodiment of the invention, the second computer system generates a transaction identifier based on the request received from the third computer system, in particular, a so-called transaction number (TAN). This transaction identifier is sent together with the attribute specification by the second computer system to the first computer system. In this embodiment, the message generated by the first computer system also contains, in addition to the at least one signed attribute and the time indication, this transaction identifier, which preferably is also signed.

When the second computer system receives the message from the first computer system, it can, using the transaction identifier of the message, assign this message the request received from the third computer system and thus also the at least one attribute received with this message to the third computer system and/or its ID token.

"Transaction identifier" is understood here to mean any known value that enables the attribute specification sent from the second computer system to the first computer system to be assigned to the message hereupon received by the second computer system. The transaction identifier can be an identifier, such as a unique identifier or a globally unique identifier (GUID).

In a further aspect, the invention relates to a computer program product, in particular a digital storage medium, with executable program instructions for carrying out a method according to the invention.

According to embodiments of the invention, an ID token is used with a secure memory area for storing at least one attribute, with means of authenticating, relative to the ID token, a user assigned to the ID token, means of authenticating a first computer system relative to the ID token, means for generating a secure connection to the first computer system, by means of which the first computer system can read the at least one attribute, whereby a necessary prerequisite for the first computer system to read the at least one attribute from the ID token is the successful authentication of the user and of the first computer system relative to the ID token.

In addition to the authentication of the first computer system relative to the ID token, where it is known as Extended Access Control for machine-readable travel documents (MRTD) and is designated as such by the International Civil Aviation Organization (ICAO), the user must authenticate himself relative to the ID token. For example, successful authentication of the user relative to the ID token unlocks the token so that the next steps, namely the authentication of the first computer system relative to the ID token and/or the generation of a secure connection for reading the attributes can run.

According to one embodiment of the invention, the ID token has a means for end-to-end encryption. This allows the connection to be established between the ID token and the first computer system via a third computer system of the user, as the user can make no changes to the data being transmitted through the connection, due to the end-to-end encryption.

In a further aspect, the invention relates to a first computer system with means for receiving an attribute specification via a network, whereby the attribute specification specifies at least one attribute; means for authentication relative to an ID token; means for reading at least one attribute from the ID token via a secured connection; and means for generating a time indication for the at least one attribute, whereby reading the at least one attribute presupposes that a user assigned to the ID token has authenticated himself relative to the ID token.

According to one embodiment of the invention, the first computer system can contain means for generating a prompt to the user. After the first computer system has received the attribute specification, for example, from the second computer system, it then sends a request to the third computer system of the user, such that the user is prompted to authenticate himself relative to the ID token. After successful authentication of the user relative to the ID token, the first computer system receives a confirmation from the third computer system. Then the first computer system authenticates itself relative to the ID token, and a secure connection is established between the ID token and the first computer system with an end-to-end encryption.

According to one embodiment of the invention, the first computer system has multiple certificates that each specify different read accesses. After receiving the attribute specification, the first computer system selects at least one of these certificates with enough read access to read the specified attributes.

Embodiments of the first computer system according to the invention are especially advantageous, as, in combination with the necessity for authentication of the user relative to the ID token, they form an anchor of confidence for the unadulterated digital identity of the user. Here it is especially advantageous that this requires no prior registration of the user relative to the computer system and also requires no central storage of the user's attributes that form the digital identity.

According to one embodiment of the invention, the first computer system receives an identifier of the second computer system together with the attribute specification. With the aid of the identifier, the computer system identifies the second computer system, which may use the identification services in order to charge this service relative to the second computer system.

According to one embodiment of the invention, the computer system is an officially certified trust center, in particular a trust center conforming to the Digital Signature Act.

Elements of the following embodiments that correspond to one another are identified with the same reference numeral.

FIG. 1 shows the computer system 100 of a user 102. The user computer system 100 can be a personal computer, a portable computer such as a laptop or palmtop computer, a personal digital assistant, a mobile telecommunications device, in particular a smart phone, or similar. The user computer system 100 has an interface 104 for communication with an ID token 106, which features a corresponding interface 108.

The user computer system 100 has at least one processor 110 for executing program instructions 112, as well as a network interface 114 for communication via a network 116. The network can be a computer network, such as the Internet, for example.

The ID token 106 has an electronic memory 118 with secure memory areas 120, 122 and 124. The secure memory area 120 serves to save a reference value, which is required for authentication of the user 102 relative to the ID token 106. This reference value may be, e.g., a known value, in particular a personal identification number (PIN), or it may be reference data for a biometric characteristic of the user 102, which can be used for authentication of the user relative to the ID token 106.

The secure area 122 serves to save a private key, and the secure memory area 124 serves to save attributes, for example, of the user 102, such as his name, address, birth date, and sex, and/or attributes that relate to the ID token itself, such as, e.g., the institution that provided or issued the ID token, the period of validity of the ID token, or an identifier of the ID token, such as a passport number or a credit card number.

The electronic memory 118 can further feature a memory area 126 for saving a certificate. The certificate contains a public key, which is assigned to a private key stored in the secure memory area 122. The certificate can be generated according to a public key infrastructure (PKI) standard, for example, the X.509 Standard.

The certificate need not necessarily be stored in the electronic memory 118 of the ID token 106. The certificate can be stored alternatively or additionally in a public directory server.

The ID token 106 has a processor 128. The processor 128 serves to execute program instructions 130, 132 and 134. The program instructions 130 serve to authenticate the user, that is, for authentication of the user 102 relative to the ID token.

In an embodiment with PIN, the user 102 enters his PIN for authentication into the ID token 106, for example, by means of the user computer system 100. Through execution of the program instructions 130, the secure memory area 120 is then accessed, in order to compare the input PIN with the reference value of the PIN that is stored there. If the input PIN agrees with the reference value of the PIN, the user 102 is authenticated.

Alternatively, a biometric characteristic of the user 102 is registered. For example, the ID token 106 may have a fingerprint sensor for this purpose, or a fingerprint sensor may be connected to the user computer system 100.

In this embodiment, the biometric data collected from the user 102 are compared, by means of execution of program instructions 130, with the biometric reference data stored in the secure memory area 120. With sufficient agreement between the biometric data collected from the user 102 and the biometric reference data, the user 102 is authenticated.

The program instructions 134 serve to execute those steps relating to the ID token 106, said steps being part of a cryptographic protocol for authenticating an ID-provider computer system 136 relative to the ID token 106. The cryptographic protocol can be a challenge-response protocol based on a symmetrical key or an asymmetrical key pair.

For example, the cryptographic protocol may implement an extended access control method, as specified by the ICAO for machine-readable travel documents. The ID-provider computer system 136 authenticates itself relative to the ID token through successful execution of the cryptographic protocol and thereby verifies its read authorization to read the attributes stored in the secure memory area 124. The authentication can also be reciprocal, that is, the ID token 106 must also authenticate itself relative to the ID-provider computer system 136 according to the same or another cryptographic protocol.

The program instructions 132 serve end-to-end encryption of data transmitted between the ID token 106 and the ID-provider computer system 136, or at least the attributes read out from the secure memory area 124 of the ID-provider computer system 136. For the end-to-end encryption a symmetrical key can be used, which, for example, is agreed upon between the ID token 106 and the ID-provider computer system 136 during execution of the cryptographic protocol.

In an alternative to the embodiment illustrated in FIG. 1, the user computer system 100 with its interface 104 can communicate via a reader for the ID token 106 connected to the interface 104 rather than directly with the interface 108. The PIN input can also take place via this reader, such as a so-called Class 2 chip card terminal.

The ID-provider computer system 136 has a network interface 138 for communication via the network 116. Further, the ID-provider computer system 136 has a memory 140, in which a private key 142 of the ID-provider computer system 136, as well as the corresponding certificate 144, is stored. This certificate can also be a certificate according to a PKI standard such as X.509.

The ID-provider computer system 136 also has at least one processor 145 for executing program instructions 146 and 148. Execution of the program instructions 146 carries out the steps of the cryptographic protocol that pertain to the ID-provider computer system 136. Thus, the cryptographic protocol is implemented through execution of program instructions 134 by the processor 128 of the ID token 106, as well as through execution of program instructions 146 by the processor 145 of the ID-provider computer system 136.

The program instructions 148 serve to implement the end-to-end encryption on the side of the ID-provider computer system 136, for example based on the symmetrical key that has been agreed upon during execution of the cryptographic protocol between the ID token 106 and the ID-provider computer system 136. In principle, any previously known method for agreement on the symmetrical key for the end-to-end encryption can be used, such as a Diffie-Hellman key exchange.

The ID-provider computer system 136 is preferably located in an especially secure environment, particularly in a so-called trust center, such that the ID-provider computer system 136, in combination with the necessity for authentication of the user 102 relative to the ID token 106, forms the anchor of confidence for the authenticity of the attributes read from the ID token 106.

The ID-provider computer system 136 also has a time base 174, which gives the current time of day, for example. The time base 174 can be the system clock. The time base 174 continuously delivers current time indications, for example as UNIX time.

The processor 145 serves to execute program instructions 172, which, with the aid of the time base 174, generate a time stamp for the at least one attribute read from the ID token 106 by the ID-provider computer system 136. For example, the program instructions 172 are designed such that, at the moment it is received, the attribute read from the ID token 106 is provided by the ID-provider computer system 136 with a time stamp, which thus gives the time of receipt.

Alternatively or additionally, an attribute received by the ID-provider computer system 136 from the ID token 106 is provided with a time stamp that gives the send time of a message containing this attribute, for example, in the form of a soft token, from the ID-provider computer system 136.

It is also possible for the program instructions 172 to be designed such that a time stamp with a time indication in the future is assigned to an attribute read from the ID token 106. This time indication gives the maximum period of validity of a message that contains the attribute and is generated by the ID-provider computer system 136, for example, a soft token generated by the ID-provider computer system 136. In this case, the time stamp of the attribute can indicate a point in time that is a few seconds or minutes behind the time the attribute was received by the ID-provider computer system 136, or the time the message was generated or sent.

A service computer system 150 can be designed to accept an order or contract for a service or product, particularly an online service. For example, the user 102 can open an account at a bank online via the network 116, or use some other financial or bank service. The service computer system 150 can also be designed as an online warehouse such that the user 102 can, e.g., acquire a mobile telephone or similar online. The service computer system 150 can also be designed to deliver digital content, for example, to download music and/or video data.

To this end, the service computer system 150 has a network interface 152 to connect with the network 116. Further, the service computer system 150 has at least one processor 154 to execute program instructions 156. Through execution of program instructions 156, for example, dynamic HTML pages are generated, by means of which the user 102 can enter his contract or order.

Depending on the type of product or service that has been contracted or ordered, the service computer system 150 must test one or more attributes of the user 102 and/or his ID token 106 using one or more preset criteria. Only if this test is passed will the order or contract of the user 102 be accepted and/or carried out.

For example, to open a bank account or purchase a mobile telephone with the associated contract, it is necessary for the user 102 to disclose his identity relative to the service computer system 150, and for this identity to be tested. To this end, in the state of the art, the user 102 must furnish his identity card, for example. This procedure is replaced by the reading of the digital identity of the user 102 from his ID token 106.

Depending on the use case, however, the user 102 need not disclose his identity relative to the service computer system 150; rather it suffices to transmit, e.g., just one of the attributes. For example, the user 102 can generate a message via one of the attributes that he belongs to a particular group of people that is authorized to access the data that is kept ready for downloading on the service computer system 150. Such a criterion can be a minimum age of the user 102 or membership of the user 102 in a circle of people who have authorization to access particular confidential data.

The processor 154 also serves to execute program instructions 176, 178 and 180. Execution of program instructions 176 assigns a transaction number (TAN) for the transaction desired by the user 102, that is, his contract or order.

Through execution of program instructions 178, the service computer system 150 can test the validity of a signature of a message received by the ID-provider computer system 136. Execution of program instructions 180 can also test the validity period of such a response, i.e., whether the period of validity of the message has already expired. To this end, execution of the program instructions can access a time base 182 of the service computer system 150, which is synchronous with the time base 174 of the ID-provider computer system 136.

The service computer system 150 also has a memory 184 for saving the allocation of session IDs and TANs, for example, in the form of a table 186.

For the user 102 to utilize a service provided by the service computer system 150, the following steps may take place:

1. The user 102 starts a browser program of his user computer system 100 and enters the URL of a website of the service computer system 150. An Internet connection is thereupon established between the user computer system 100 and the service computer system 150, and is assigned a session ID. The relevant website is transmitted from the service computer system 150 to the user computer system 100 and displayed there with the aid of the web browser. The user 102 can then choose a particular service on this website and actuate the input key. Then the user computer system 100 generates a service request 164 and transmits it to the service computer system 150. Execution of the program instructions 176 assigns a TAN to this service request 164. The session ID belonging to this service request 164 is stored together with this TAN in the table 186.

Execution of the program instructions 156 then generates an attribute specification 166 that contains a specification of those attributes of the user 102 that the service computer system 150 requires for provision of the services requested with the service request 164. Further, the attribute specification 166 also contains the TAN assigned to the service request 164 and/or its session ID.

The attribute specification 166 with the TAN is transmitted by the service computer system 150 to the ID-provider computer system 136 either indirectly via the user computer system 100 or directly via the network 116.

2. Authentication of the user 102 relative to the ID token 106.

The user 102 authenticates himself relative to the ID token 106. In an implementation with PIN, the user 102 does so by entering his PIN, for example via the user computer system 100 or a chip card terminal connected to it. Through execution of program instructions 130, the ID token 106 then checks the correctness of the input PIN. If the input PIN agrees with the reference value of the PIN that is stored in the secure memory area 120, then the user 102 is authenticated. Analogously, the procedure can take place as described above if the user 102 employs a biometric characteristic for authentication.

3. Authentication of the ID-provider computer system 136 relative to the ID token 106.

To this end, a connection is established between the ID token 106 and the ID-provider computer system 136 via the user computer system 100 and the network 116. For example, the ID-provider computer system 136 transmits its certificate 144 via this connection to the ID token 106. Through the program instructions 134, a challenge is generated that is, for example, a random number. This random number is encrypted with the public key of the ID-provider computer system 136 contained in the certificate 144. The resulting secret text is sent by the ID token 106 via the connection to the ID-provider computer system 136. The ID-provider computer system 136 deciphers the secret text using its private key 142 and thereby obtains the random number. The ID-provider computer system 136 sends the random number via the connection back to the ID token 106. Execution of the program instructions 134 tests whether the random number received by the ID-provider computer system 136 agrees with the originally generated random number, that is, the challenge. If so, then the ID-provider computer system 136 is authenticated relative to the ID token 106. The random number can be used as a symmetrical key for the end-to-end encryption.

4. After the user 102 and the ID-provider computer system 136 have each been successfully authenticated relative to the ID token 106, the ID-provider computer system 136 receives a read authorization to read one, several, or all of the attributes stored in the secure memory area 124. Based on an appropriate read command, which the ID-provider computer system 136 sends via the connection to the ID token 106, the requested attributes are read from the secure memory area 124 and encrypted through execution of the program instructions 132. The encrypted attributes 188 are transmitted via the connection to the ID-provider computer system 136 and there deciphered through execution of the program instructions 148. The ID-provider computer system 136 thereby receives knowledge of the attributes read from the ID token 106.

5. These attributes are signed by the ID-provider computer system 136 with the aid of its certificate 144 and its private key 142. In addition, a time stamp is generated for these attributes through execution of the program instructions 172, with the aid of the time base 174. The time stamp and the TAN, which have been received with the attribute specification 166, are also signed by the ID-provider computer system 136. For example, the attributes, the time stamp and the TAN may each be separately signed. Alternatively, the response 170 is generated that contains the attributes, the time stamp and the TAN. The response 170 is then signed overall.

The response 170 is transmitted from the ID-provider computer system 136 via the user computer system 100 or directly to the service computer system 150. The service computer system 150 then tests the validity of the signature(s) of the response 170.

The service computer system 150 also tests, through execution of the program instructions 180, whether the response 170 is still valid. To this end, it tests whether a maximum period of validity, given by the time stamp, has expired. Execution of the program instructions 156 also accesses the table 186 in order to identify the corresponding session ID using the TAN contained in the response 170.

In this way, the service computer system 150 can correlate the attributes received with the response 170 with the respective session ID. If the signature(s) are valid and the period of validity of response 170 has not been exceeded, the service computer system 150 can then provide to the user 102 the service which was requested with the service request 164, to the extent that the attributes of the user 102 received with the response 170 allow.

The message generated by the ID-provider computer system 136, that is, the response 170, can be designed as, for example, a so-called soft token.

The necessary anchor of confidence is created with the requirement of authentication of the user 102 relative to the ID token 106 and the authentication of the ID-provider computer system 136 relative to the ID token 106, such that the service computer system 150 can be certain that the attributes of the user 102 communicated to it by the ID-provider computer system 136 are accurate and not falsified.

The order of authentication can vary depending on the embodiment. For example, it can be designed such that the user 102 must first authenticate himself relative to the ID token 106, and then the ID-provider computer system 136 must do so. But it is also possible in principle that the ID-provider computer system 136 must authenticate itself relative to the ID token 106 first, and only then does the user 102 do so.

In the first case, the ID token 106 is designed such that it is unlocked only when a correct PIN or biometric characteristic is input by the user 102. Only this unlocking enables program instructions 132 and 134 to start and with that, the authentication of the ID-provider computer system 136.

In the second case, the program instructions 132 and 134 may be started even if the user 102 has not yet authenticated himself relative to the ID token 106. In this case, for example, program instructions 134 are designed such that the ID-provider computer system 136 can execute a read access to the secure memory area 124 for reading one or more attributes only after the successful authentication of the user 102 has also been signaled by the program instructions 130.

Of particular advantage is the utilization of the ID token 106 for, e.g., e-commerce and e-government applications, as it prevents security breaches and is legally secure, due to the anchor of confidence established by the requirement of authentication of the user 102 and of the ID-provider computer system 136 relative to the ID token 106. Of particular advantage also is the fact that a central memory of attributes of various users 102 is not required, so the data security problems of the state of the art are hereby solved. Regarding the convenience of the application of the method, it is particularly advantageous that prior registration of the user 102 for utilizing the ID-provider computer system 136 is not necessary.

Figure 2:
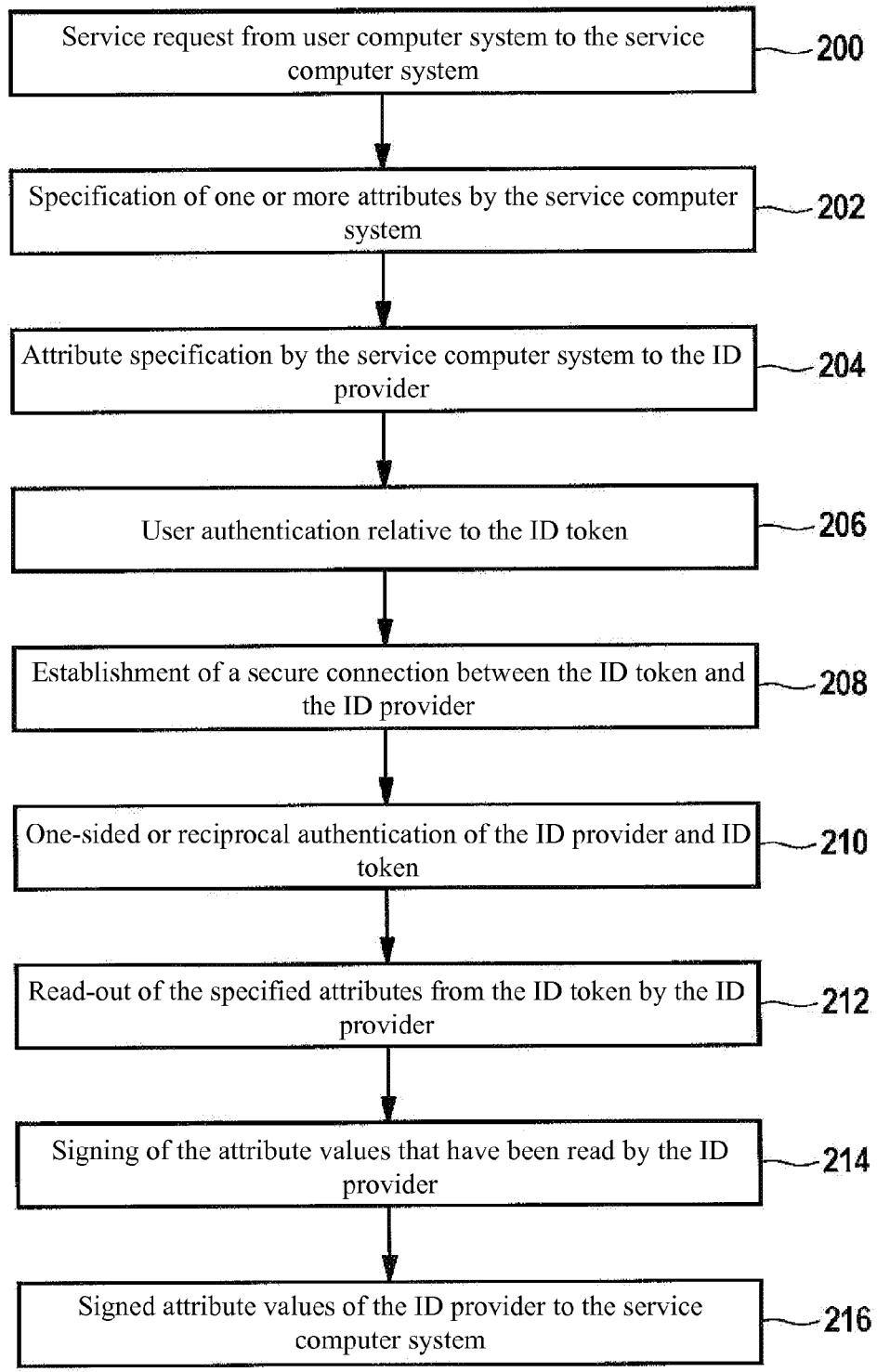
FIG. 2 shows a flowchart of an embodiment of a method according to the invention.

FIG. 2 shows an embodiment of a method according to the invention. In step 200, a service request is sent from the user computer system to the service computer system. For example, the user starts an Internet browser of the user computer system and enters a URL to call up a webpage of the service computer system. In the webpage called up, the user then enters his service request, for example, to order or contract for a service or product.

In step 202, the service computer system 150 specifies one or more attributes that it needs to test the user's right to request the service. In particular, the service computer system can specify such attributes that determine the digital identity of the user 102. This specification of attributes by the service computer system 150 can be firmly specified or, in isolated cases, can be determined by the service computer system 150 using the predetermined rules, depending on the service request.

In step 204, the attribute specification, i.e., the specification carried out in step 202 of the one or more attributes, is transmitted to the ID-provider computer system with a TAN from the service computer system, either directly or via the user computer system.

In order to give the ID-provider computer system the ability to read attributes from his ID token, the user authenticates himself relative to the ID token in step 206.

In step 208, a connection is established between the ID token and the ID-provider computer system. This is preferably a secure connection, for example, according to a secure messaging method.

In step 210, at a minimum, authentication of the ID-provider computer system relative to the ID token takes place via the connection established in step 208. In addition, authentication of the ID token relative to the ID-provider computer system can also be provided for.

After the user and the ID-provider computer system have both been successfully authenticated relative to the ID token, the ID-provider computer system receives from the ID token the access authorization to read out the attributes. In step 212, the ID-provider computer system sends one or more read commands to read from the ID token the attributes required according to the attribute specification. The attributes are then transmitted to the ID-provider computer system through the secure connection using end-to-end encryption, and there deciphered.

The attribute values that have been read out are provided by the ID-provider computer system with a time stamp in step 214 and signed together with the TAN. In step 216, the ID-provider computer system sends the signed attribute values over the network. The signed attribute values reach the service computer system either directly or via the user computer system. In the latter case, the user has the option of registering the signed attribute values and/or supplementing them with further data. If need be, it can be stipulated that the signed attribute values are relayed from the user computer system to the service computer system with the supplemented data only after release by the user. This creates the maximum possible transparency for the user with regard to the attributes sent by the ID-provider computer system to the service computer system.

Figure 3B:
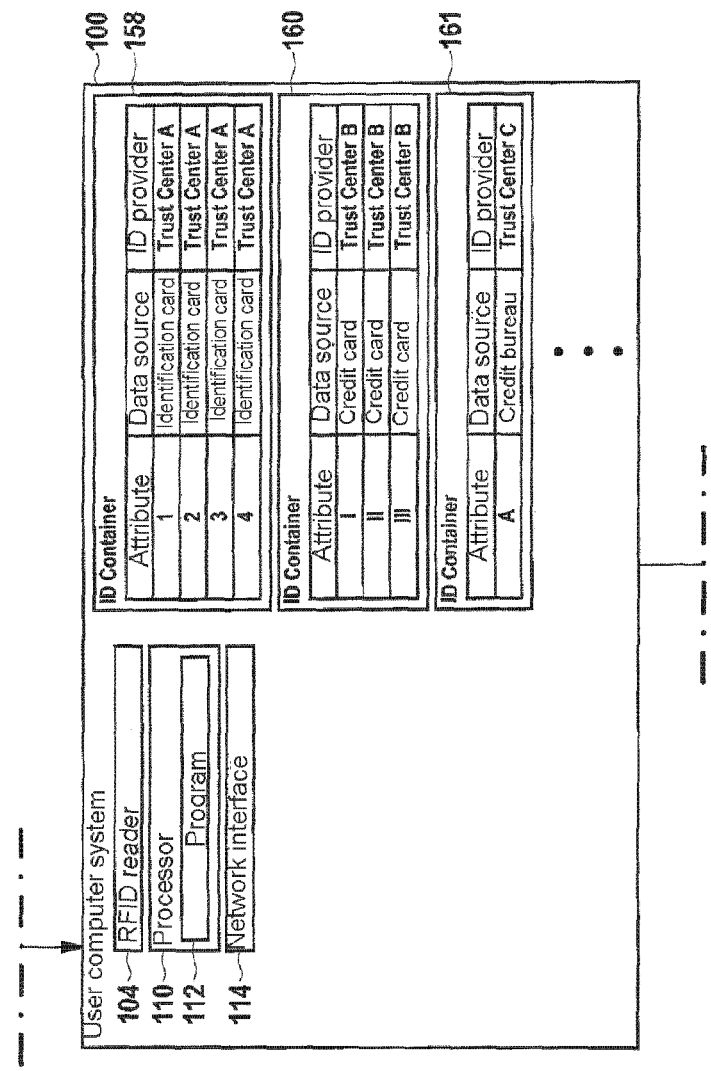
FIG. 3 shows a block diagram of further embodiments of computer systems according to the invention.

FIG. 3 shows further embodiments of an ID token and computer systems according to the invention. In the embodiment in FIG. 3, the ID token 106 is designed as a document, such as a paper- and/or plastic-based document with an integrated electronic switching circuit, through which the interface 108, the memory 118, and the processor 128 are formed. The integrated electronic switching circuit can be a radio tag, which is also known as an RFID tag or RFID label. The interface 108 can also be designed as contact-based or as a dual mode interface.

In particular, the document 106 can be a value document or a security document such as, e.g., a machine-readable travel document, such as an electronic passport or identity card, or a means of payment such as a credit card.

In the embodiment viewed here, attributes i are stored in the secure memory area 124, whereby $1 \leq i \leq n$. In the following, it is assumed, without limiting the generality, that the ID token 106 shown as an example in FIG. 3 is an electronic personal identity card. For example, attribute i=1 is the last name, attribute i=2 is the first name, attribute i=3 is the address, and attribute i=4 is the birth date, etc.

In the embodiment considered here, the interface 104 of the user computer system 100 can be designed as an RFID reader, which can form an integral component of the user computer system or be connected to it as separate components.

The user 102 possesses one or more further ID tokens that in principle are identically designed, such as for example an ID token 106', which is a credit card.

Multiple configuration data sets 158, 160, . . . are stored in the user computer system 100. Each of the configuration data sets specifies, for a particular attribute set, a data source and an ID-provider computer system which can read the specified data source. In this embodiment, the user computer system 100 can, via the network 116, address various ID-provider computer systems 136, 136', . . . , each of which can belong to different trust centers. For example, the ID-provider computer system 136 belongs to trust center A, and the ID-provider computer system 136', which in principle is identically structured, belongs to another trust center B.

The attribute set of attributes i=1 through i=4 is defined in the configuration data set 158, which is also termed an ID container. The data source "personal identity card," i.e., the ID token 106, and the trust center A, i.e., the ID-provider computer system 136, are assigned to each attribute, respectively. This can be specified, for example, in the form of its URL in the configuration data set 158.

The configuration data set 116, on the other hand, defines an attribute set I, II and III. The credit card, i.e. the ID token 106', is specified as the data source for these attributes. The ID token 106' has a secure memory area 124' in which the Attributes I, II, III, . . . , are stored. Attribute I, for example, can be the name of the credit card holder, Attribute II can be the credit card number, and Attribute III can be the period of validity of the credit card, etc.

The ID-provider computer system 136' of trust center B is specified as the ID-provider computer system in the configuration data set 160.

Alternatively to the embodiment shown in FIG. 3, various data sources and/or ID-provider computer systems can be specified in the same configuration data set for different attributes.

In the embodiment in FIG. 3, each of the ID-provider computer systems 136, 136', . . . , can have multiple certificates.

For example, in the memory 140 of the ID-provider computer system 136, which is shown as an example in FIG. 3, multiple certificates, such as certificates 144.1 and 144.2, are stored with the assigned private keys 142.1 and 142.2, respectively. Read accesses of the ID-provider computer system 136 for attributes i=1 through i=4 are defined in certificate 144.1, whereas read accesses for attributes I through III are defined in certificate 144.2.

To use a service provided by the service computer system 150, the user 102 first enters a user input 162 into the user computer system 100, in order to input, for example, his request for the desired service in a webpage of the service computer system 150. This service request 164 is transmitted by the user computer system 100 to the service computer system 150 via the network 116. The service computer system 150 then responds with an attribute specification 166, that is, with a specification of those attributes that the service computer system 150 requires to process the service request 164 from the user 102, such as a TAN. The attribute specification can, for example, take place in the form of the attribute names, such as "Last Name," "First Name," "Address," "Credit Card Number."

The user computer system 100 signals the user 102 when it has received the attribute specification 166. The user 102 can then choose one or more configuration data sets 158, 160, . . . , as required, each of which defines attribute sets that contain the attributes, at least as subsets, according to the attribute specification 166.

If the attribute specification 166 demands, e.g., only the communication of the first name, last name, and address of the user 102, the user 102 can select the configuration data set 158. However, if in the attribute specification 166 the credit card number is also specified, the user 102 can also choose configuration data set 160. This process can also be carried out fully automatically by the user computer system 100, for example, by execution of program instructions 112.

In the following, it will be assumed that only one of the configuration data sets, such as configuration data set 158, is selected based on attribute specification 166.

The user computer system 100 then sends a request 168 to the ID-provider computer system(s) specified in the selected configuration data set, in this example, to the ID-provider computer system 136 of trust center A. This request 168 contains a specification of the attributes to be read by the ID-provider computer system 136 from the data source given in the configuration data set 158 according to attribute specification 166.

The ID-provider computer system 136 then selects one or more of its certificates, which the read accesses required to read these attributes have. If for example the attributes i=1 through 3 are to be read from the personal identity card, the ID-provider computer system 136 selects its certificate 144.1, which defines the read accesses needed to do so. This certificate selection is carried out through execution of the program instructions 149.

The execution of the cryptographic protocol is then started. For example, to this end, the ID-provider computer system 136 sends a response to the user computer system 100. The user computer system 100 then prompts the user 102 to authenticate himself relative to the specified data source, i.e., here, relative to the personal identity card.

The user 102 then puts his personal identity card, i.e., the ID token 106, near the RFID reader 104 and enters his PIN, for example, to authenticate himself. Successful authentication of the user 102 relative to the ID token 106 releases the token for execution of the cryptographic protocol, i.e., to carry out program instructions 134. Afterwards, the ID-provider computer system 136 authenticates itself relative to the ID token 106 with the aid of the selected certificate 144.1, for example with the help of a challenge-response protocol. This authentication can also be reciprocal. After successful authentication of the ID-provider computer system 136 relative to the ID token 106, the ID-provider computer system directs a request to read the required attributes to the user computer system 100, which relays it via the RFID reader 104 to the ID token 106. Using the certificate 144.1, the ID token 106 tests whether the ID-provider computer system 136 has the read accesses required for this. If so, the desired attributes are read from the secure memory area 124 and transmitted to the ID-provider computer system via the user computer system 100 using end-to-end encryption.

The ID-provider computer system 136 then sends a response 170 that contains the selected attributes, a time stamp, and the TAN, to the service computer system 150 via the network 116. The response 170 is digitally signed with the certificate 144.1.

Alternatively, the ID-provider computer system 136 sends the response 170 to the user computer system 100. The user 102 then has the option of reading the attributes contained in the response 170 and deciding whether he really wants to relay these attributes to the service computer system 150 or not. Only after the user 102 has entered a release command into the user computer system 100 is the response 170 relayed to the service computer system 150. In this embodiment it is also possible for the user 102 to supplement the response 170 with additional data.

If multiple ID-provider computer systems 136, 136', . . . , are involved, the individual responses of the ID-provider computer systems can be collected by the user computer system 100 into a single response, which contains all of the attributes according to attribute specification 166, said response then being sent by the user computer system 100 to the service computer system 150.

According to one embodiment of the invention, when the service request 164 occurs, the user 102 can disclose one or more of his attributes relative to the service computer system 150, in that these attributes of the user are transmitted to the service computer system as part of the service request 164 via the network 116. Specifically, the user 102 can enter these attributes into the webpage of the service computer system 150. The accuracy of these attributes is then confirmed by the response 170, that is, the service computer system 150 can compare the attributes received from the user 102 with the attributes read by the ID-provider computer system 136 from the ID token 106 and check that they agree.

According to another embodiment of the invention, at least one more attribute can be indicated in the attribute specification 166, which is not stored on one of the ID tokens of the user 102 but can be queried from an external data source. This can be, for example, an attribute pertaining to the creditworthiness of the user 102. For this, the user computer system 100 can contain a further configuration data set 161, which contains the specification of a data source and an ID-provider computer system for the attribute A, e.g., creditworthiness. The data source can be an online credit agency such as Schufa, Dun & Bradstreet, or similar. A trust center C is specified as ID-provider computer system, as in the embodiment of FIG. 3. The data source here can be found in trust center C.

In order to query attribute A, the user computer system 100 directs an appropriate request (not shown in FIG. 3) to the trust center C, i.e., the ID-provider computer system 136". This then provides attribute A, which the user computer system 100 relays to the service computer system 150, along with the further attributes that were read from the ID token(s) of the user 102.

The query of attribute A takes place preferably after the attributes pertaining to the digital identity of the user 102 have already been queried from one of the ID tokens of the user 102, and for example have been received as a signed response 170 by the user computer system 100. The query of attribute A by the user computer system 136" through the ID-provider computer system 100 then contains the signed response 170 such that the ID-provider computer system 136" has secure information regarding the identity of the user 102.

Figure 4:
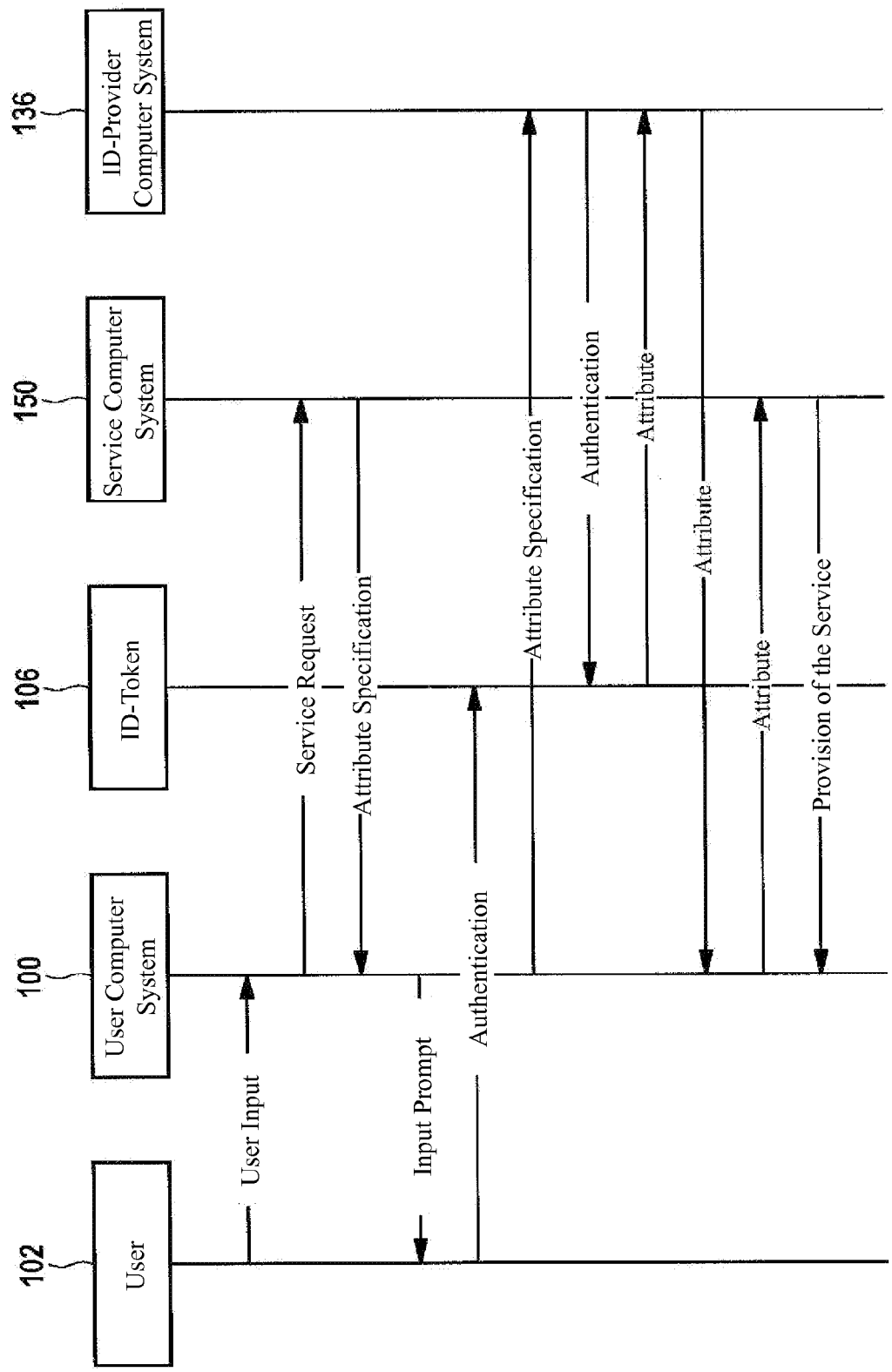
FIG. 4 shows a flow chart of a further embodiment of a method according to the invention.

FIG. 4 shows a further embodiment of a method according to the invention. By means of an input by the user 102 into a user computer system 100, the user 102 specifies a service of a service computer system, which he or she would like to use. This takes place for example through calling up an Internet page of the service computer system and by selecting one of the services offered there. The service request of the user 102 is transmitted from the user computer system 100 to the service computer system 150.

The service computer system 150 responds to the service request with a TAN and an attribute specification, e.g., a list of attribute names. After it has received the attribute specification, the user computer system 100 prompts the user 102 to authenticate himself relative to the ID token 106, for example, through requesting an input.

The user 102 then authenticates himself relative to the ID token 106, for example through inputting his PIN. After successful authentication, the attribute specification is relayed by the user computer system 100 to an ID-provider computer system 136. This then authenticates itself relative to the ID token 106 and directs a read request to the ID token 106 to read the attributes according to the attribute specification.

Assuming the prior authentication of the user 102 and the ID-provider computer system 136 has been successful, the ID token 106 responds to the read request with the desired attributes. The ID-provider computer system 136 signs the attributes and sends the signed attributes together with a time stamp and the TAN to the user computer system 100. After release by the user 102, the signed attributes are then transmitted with the time stamp and TAN to the service computer system 150, which then can provide the desired service if applicable, if the attributes fulfill the criteria necessary for this, if the signature is valid, and if the attributes are received by the service computer system 150 within the period of validity given by the time stamp.

LIST OF REFERENCE NUMERALS

100 User computer system
102 User
104 Interface
106 ID token
108 Interface
110 Processor
112 Program instructions
114 Network interface
116 Network
118 Electronic memory
120 Secure memory area
122 Secure memory area
124 Secure memory area
126 Memory area 128 Processor
130 Program instructions
132 Program instructions
134 Program instructions
136 ID-provider computer system
138 Network interface
140 Memory
142 Private key
144 Certificate
145 Processor
146 Program instructions
148 Program instructions
149 Program instructions
150 Service computer system
152 Network interface
154 Processor
156 Program instructions
158 Configuration data set
160 Configuration data set
161 Configuration data set
162 User input
164 Service request
166 Attribute specification
168 Request
170 Response
172 Program instructions
174 Time base
176 Program instructions
178 Program instructions
180 Program instructions
182 Time base
184 Memory
186 Table
188 Attributes

What is claimed is:

1. A computer system comprising:
a receiving component capable of receiving an attribute specification generated by a service computer via a network, wherein the attribute specification specifies at least one attribute stored in a secure memory of an ID token assigned to a user and having an interface with a user computer, where the attribute specification is transmitted from the service computer to the receiving component via the user computer;
an authenticating component capable of authentication of the computer system to the ID token;
an attribute reading component capable of reading at least one attribute from the ID token via a secure connection in accordance with the attribute specification;
a generating component capable of generating a time indication for the at least one attribute, wherein the reading of the at least one attribute presupposes that both the user to which the ID token is assigned and the computer system have authenticated themselves to the ID token;
a signing component capable of signing the at least one attribute and the time indication, and
a sending component capable of sending the signed at least one attribute and time indication to the user computer for relay to the service computer, without use of any direct communication link between the computer system and the service computer.

2. The computer system according to claim 1, further comprising:
a request generating component capable of generating a request to the user for authentication to the ID token, based on reception of the attribute specification.

3. The computer system according to claim 1, wherein the receiving component and the sending component are formed by a second computer system.

4. The computer system according to claim 1, wherein the attribute specification specifies at least one transaction identifier, and wherein the transaction identifier is generated by the service computer system in response to a request from the user computer during a transaction.

5. The computer system according to claim 4, wherein the signing component is further capable of signing the at least one attribute, the time indication and/or the transaction identifier, and wherein the signed attribute is sent together with the signed time indication and/or the signed transaction identifier.

6. The computer system according to claim 4, further comprising an ID token and a service computer system, where the ID token comprises:
a secure memory area for saving at least one attribute,
a user authenticating component capable of authentication of a user assigned to the ID token to the ID token,
a computer authenticating component capable of authentication of a first computer system to the ID token,
a security component capable of establishing a secure connection to the first computer system, by which the first computer system can read out the at least one attribute,
wherein a necessary prerequisite for the first computer system to read out the at least one attribute from the ID token is the successful authentication of the user and the first computer system to the ID token, and
wherein the service computer system comprises:
an assigning component capable of assigning the at least one received attribute to the attribute specification using the transaction identifier,
a testing component capable of testing the signature,
a validity testing component capable of testing the validity of the at least one received attribute using the time indication, and
an executing component capable of executing the transaction, wherein the transaction is executed only if the signature is valid and if the at least one received attribute is valid.

7. The computer system according to claim 1, further comprising:
a plurality of certificates of various read accesses, wherein the computer system is configured to select at least one of the certificates, based on the reception of the attribute specification, the certificate possessing sufficient read accesses to read the attributes specified in the attribute specification.

8. A method providing at least one attribute, signed by a first computer system, to a second computer system, where the at least one attribute is stored in a secure memory of an ID token assigned to a user, the method comprising:
the ID token authenticating the user, where the ID token comprises an electronic identification document having an interface with a third computer system and where the third computer system is a user computer system;
the ID token authenticating the first computer system via a network link between the first and third computer systems; and
after successful authentication of the user and the first computer system by the ID token:
transmitting, to the first computer, via the third computer, a transaction number generated by the second computer system and an attribute specification;

allowing a read access by the first computer of at least one attribute stored in the ID token in accordance with the attribute specification;

the third computer receiving from the first computer system, via the network link, the transaction identifier and a time stamp for the at least one attribute, where the at least one attribute, the time stamp and the transaction identifier are signed by the first computer; and transmitting the at least one attribute, the time stamp and the transaction identifier, all signed by the first computer system, from the third computer system to the second computer system, without use of any direct communication link between the first computer system and the second computer system.

9. A method providing at least one attribute, signed by a first computer system, to a second computer system, where the at least one attribute is stored in a secure memory of an ID token assigned to a user, the method comprising:

in response to a request received from a third computer system, the second computer generating a transaction number and an attribute specification, where the third computer system comprises user computer system having an interface with the ID token, and where the attribute specification specifies the at least one attribute stored in the secure memory of the ID token;

after authentication of the user and the first computer system by the ID token:

transmitting the transaction number and attribute specification to the first computer system;

receiving from the first computer system, the at least one attribute, the transaction number and a time indicator, all signed by the first computer system; and processing the received at least one attribute after validating the signature and validating the received at least one attribute using the time indicator, where transmitting the transaction number and attribute specification to the first computer system comprises:

transmitting the transaction number and attribute specification from the second computer system to the third computer system; and transmitting the transaction number and attribute specification from the third computer system to the first computer system, and where receiving from the first computer system, the at least one attribute, the transaction number and a time indicator, all signed by the first computer system comprises:

receiving the at least one attribute, the transaction number and a time indicator from the first computer system via the third computer system.

10. A method providing at least one attribute, signed by a first computer system, to a second computer system, where the at least one attribute is stored in a secure memory of an ID token assigned to a user, the method comprising:

after authentication of the user and the first computer system by the ID token:

receiving a transaction number and an attribute specification, the transaction number and attribute specification generated by the second computer system in response to a request from a third computer system, where the third computer system comprises user computer system having an interface with the ID token, and where the attribute specification specifies the at least one attribute stored in the secure memory of the ID token;

reading at least one attribute stored in the ID token via a network link, generating a time indicator for the at least one attribute, the time indicator dependent upon a time at which the receiving or reading operations occur;

signing the at least one attribute, the time indicator and the transaction identifier; and transmitting the signed at least one attribute, the time indicator, and the transaction identifier to the second computer system, where transaction number and the attribute specification are received from the second computer system via the third computer system, and where the signed at least one attribute, the time indicator, and the transaction identifier are transmitted to the second computer system via the third computer system without use of any direct communication link between the first computer system and the second computer system.

11. An electronic identification document comprising:

an interface to a user computer system, the user computer system having a network interface that provides, via a network, a link with a first computer system and a link with a service computer system;

a memory for storing at least one attribute;

a processor, coupled to the memory, configured to:

authenticate a user associated with the electronic identification document;

authenticate the first computer system via user computer and the network; and receive, from the service computer system, an attribute specification generated by the service computer system, the attribute specification specifying one or more specified attributes of the at least one attribute;

transmit the attribute specification to the first computer system;

responsive to a request from the first computer system, transmit the one or more specified attributes of the at least one attribute stored in the memory to the first computer system;

receive, from the first computer system, the one or more specified attributes signed by the first computer system; and transmit to the service computer system the one or more specified attributes signed by the first computer system.

12. The electronic identification document according to claim 11, further comprising:

transmitting a service request to the service computer system during a transaction, wherein the attribute specification specifies at least one transaction identifier, and wherein the transaction identifier is generated by the service computer system in response to the service request.

13. The electronic identification document according to claim 11, wherein the electronic identification document comprises a paper-based or plastic-based document.

14. The electronic identification document according to claim 11, wherein the electronic identification document comprises a Universal Serial Bus (USB) stick.

15. The electronic identification document according to claim 11, wherein the memory further configured to store a Personal Identification Number (PIN) of the user that is used to authenticate the user.

16. The electronic identification document according to claim 11, wherein the processor further configured to:

establishes a secure connection with the first computer system that uses end-to-end encryption; and encrypts the one or more specified attributes before they are transmitted to the first computer system, such that the one or more specified attributes cannot be altered by the user computer system.

17. The electronic identification document according to claim 11, wherein the interface to the user computer system comprises a radio frequency interface.

18. The electronic identification document according to claim 11, wherein authenticating the user associated with the electronic identification document is performed after the attribute specification is transmitted to the first computer system and responsive to a request from the first computer.

19. The electronic identification document according to claim 11, wherein authenticating the user associated with the electronic identification document is performed before the attribute specification is transmitted to the first computer system.

20. The electronic identification document according to claim 11, wherein the electronic identification document is a document selected from the group of documents consisting of:
a passport, an identity card, a visa, a driver's license, a vehicle registration certificate, a vehicle title document, an employee identification card, and an insurance card.

* * * * *